UNITED STATES PATENT OFFICE.

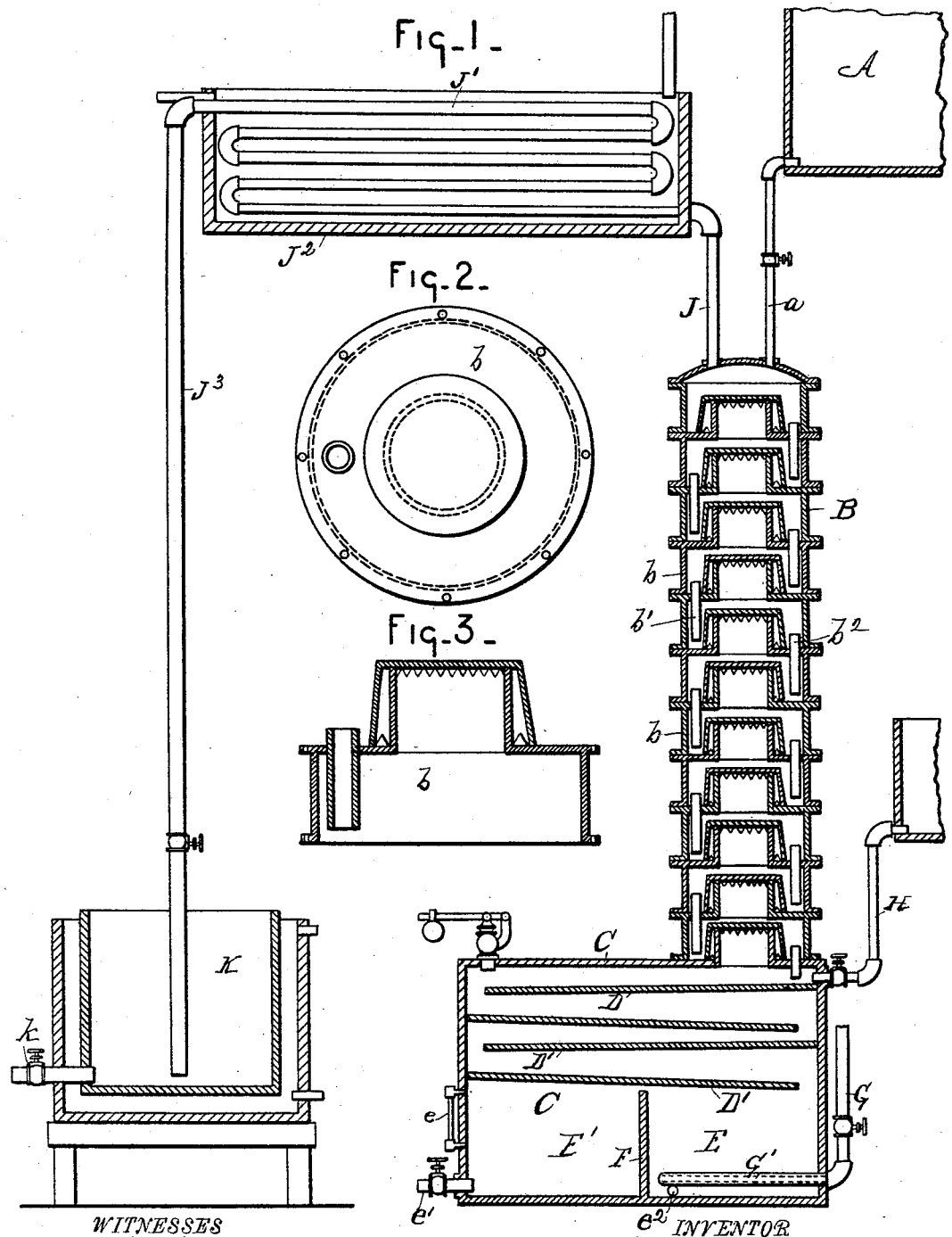

GEORGE STROH AND GEORGE OSIUS, OF DETROIT, MICHIGAN.

AMMONIA-STILL.

SPECIFICATION forming part of Letters Patent No. 435,464, dated September 2, 1890.

Application filed May 7, 1890. Serial No. 350,912. (No model.)

*To all whom it may concern:*

Be it known that we, GEORGE STROH and GEORGE OSIUS, citizens of the United States, residing at Detroit, county of Wayne, State of Michigan, have invented a certain new and useful Improvement in Ammonia-Distilling Apparatus; and we declare the following to be a full, clear, and exact description of the invention, such as will enable others skilled in the art to which it pertains to make and use the same, reference being had to the accompanying drawings, which form a part of this specification.

It is the object of our invention to produce an ammonia-distilling apparatus for removing ammonia from gas-water, and the invention relates more particularly to the production of suitable apparatus whereby the gas-water as it is passed through the apparatus will be spread over a large surface and thoroughly heated by steam passing in an opposite direction, thus freeing the ammonia from the gas-water and allowing the former to be taken up by the steam.

The invention also contemplates other features of construction, hereinafter described and claimed.

In the drawings, Figure 1 is a sectional elevation. Fig. 2 illustrates a detail of construction. Fig. 3 illustrates another detail of construction.

In carrying out the invention, A represents a suitable tank, in which the gas-water is located, and B represents the usual well-known column employed in all forms of distilling apparatus. This column is made up of sections $b$, as illustrated in Figs. 2 and 3.

$b'$ $b^2$ represent the outlets from one section to another, the lower end of the outlet $b'$ being below the upper end of the outlet $b^2$, so that the openings from one section to another are sealed when the water is passing through. As this column is old and well-known, we will not enter into the details of its construction.

C is the still proper, and is provided upon its interior with inclined plates D D', placed one above the other and inclined in opposite directions, a space being left between the lower end of each plate and the adjacent wall, whereby as the gas-water passes over the plates it may drop to the upper end of the plate next beneath.

Beneath the lower plate D' are the chambers E E', divided by the partition F.

G is a steam-pipe, whereby steam is admitted into the chamber E, the horizontal portion G' being perforated and extending across the bottom of the chamber.

$e$ represents a gage-glass connected with the chamber E', and $e'$ represents the outlet of the chamber E'.

$e^2$ represents the outlet of the chamber E.

We will now describe the operation. The gas-water is admitted into the column B through the pipe $a$. It passes through the column, through the outlets $b'$ $b^2$, and down onto the plate D. Here, by reason of the extended surface, it is spread out, flows down onto the plate next beneath, and so on down to the chamber E. Steam which has been admitted at G' passes up through the liquid in the chamber E, strikes the plate D', heats it, passes around the end of it over the top and beneath the bottom of the plate next above, thereby heating both the water which is flowing over the plate and also the under side of the plate next above, passes up around the end of the plate above, and so on up to the column. It will thus be seen that the steam heat is thoroughly utilized, both to heat the liquid which is passing down over the plates and also to thoroughly heat the plates on both sides. By thus thoroughly heating the gas-water the ammonia is freed and carried up by the steam and vapor. Its passage through the column is the same as with other stills.

To facilitate the freeing of the ammonia from the gas-water, we introduce at the upper plate D through the pipe H lime-water and allow it to mix with the gas-water as the two flow over the plates. The lime-water and gas-water, both flowing into the chamber E, are kept continually agitated by the steam which enters through the pipe G. When the chamber E has been filled, the water will overflow into the chamber E', and may be drawn off through the outlet $e'$, the object of the partition being to reduce the size of the chamber E, into which the lime-water is conveyed, and thus prevent the outlet $e'$ from being stopped up by the sediment.

We will now describe another feature of our invention. J is the outlet at the top of the column for conveying off the ammonia-gas, and this outlet communicates with the coil J', surrounding which is the chamber $J^2$, containing any suitable refrigerant. Now, as will be seen, when the ammonia-gas enters the coil J', if it be suddenly reduced to a very low temperature, it will at once condense and run back into the column, whereas if it is refrigerated only slightly or none at all it will pass through the conduit $J^3$ down to the condenser K, this condenser being surrounded by a suitable refrigerating medium. Here the gas will be condensed to a liquid form and be drawn off through the outlet $k$. It will thus be seen that by means of the coil J' and surrounding refrigerant $J^2$ the strength of the ammoniacal product may be regulated, since should the ammonia-gas not be strong enough it may be reduced to a lower temperature in the coil J', and thus be condensed and be made to flow back into the column and be again distilled. It will thus be seen that by the use of open steam surrounding the plates over which the gas-water flows the maximum efficiency of the steam is utilized, since both sides of the plates are thoroughly heated and a large surface covered. So also a continuous flow through the apparatus is obtained, since by distributing the heated surface only that time which it takes the gas-water to pass through the apparatus is required to distil it.

Another advantage is that by reason of the continuous flow above set forth the apparatus will always empty itself, thus obviating the necessity of heating up a large body of liquid when the apparatus is cooled—as, for instance, over night.

One of the advantages of introducing the steam at the bottom of the chamber E is that should all the ammonia-gas not be freed from the gas-water as the latter passes over the plates D D' it will be liberated when the water reaches the chamber E, because of the agitation of the water due to the steam passing through it. The pitch of the plates D D' may be regulated as desired; but we prefer to make the incline very slight, so that the gas-water will pass slowly over the plate on its way through the apparatus.

It is of course obvious that many details of construction might be varied—as, for instance, the partition F might be dispensed with and the construction of the column B, which is old and well known, might be varied—without departing from the spirit of our invention. So also the form and size of the coil J' may be varied and the number of pipes in the coil increased or diminished, as desired.

What we claim is—

1. In an ammonia-distilling apparatus, the combination, with the column B, inclined plates D D', water-inlet at the upper end of the column, and steam-inlet beneath the plates, of the inlet H, located above the plates, whereby lime-water or equivalent may be discharged into the gas-water before the latter passes over the plates, substantially as described.

2. The combination, with the inclined plates D D', arranged substantially as shown and described, of the chambers E E', located beneath said plates and provided with the partition F, substantially as described.

3. In an ammonia-distilling apparatus, the combination of the column B, having a water-inlet at its upper end, the still C, having the inclined plates D D' arranged therein beneath the column and provided with chambers E E', located beneath said plates, steam-inlet G and lime-water inlet H, the refrigerating-chamber $J^2$, containing a coil J', connected with the top of the column, and the condenser K, connected with said coil, substantially as described.

In testimony whereof we sign this specification in the presence of two witnesses.

GEORGE STROH.
                GEORGE OSIUS.

Witnesses:
  MARION A. REEVE,
  W. H. CHAMBERLIN.